May 12, 1942. R. GUNN 2,282,354
EXPANSION COMPENSATING MEANS FOR STEAM PIPING
Filed Sept. 28, 1940 2 Sheets-Sheet 1
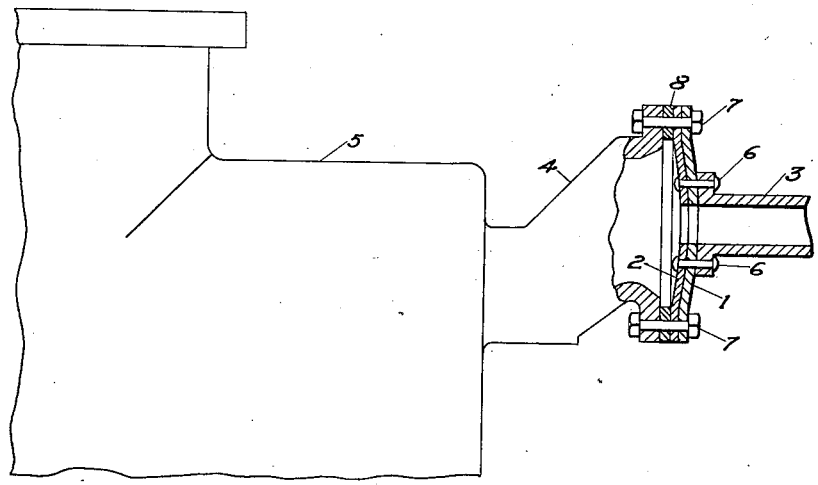
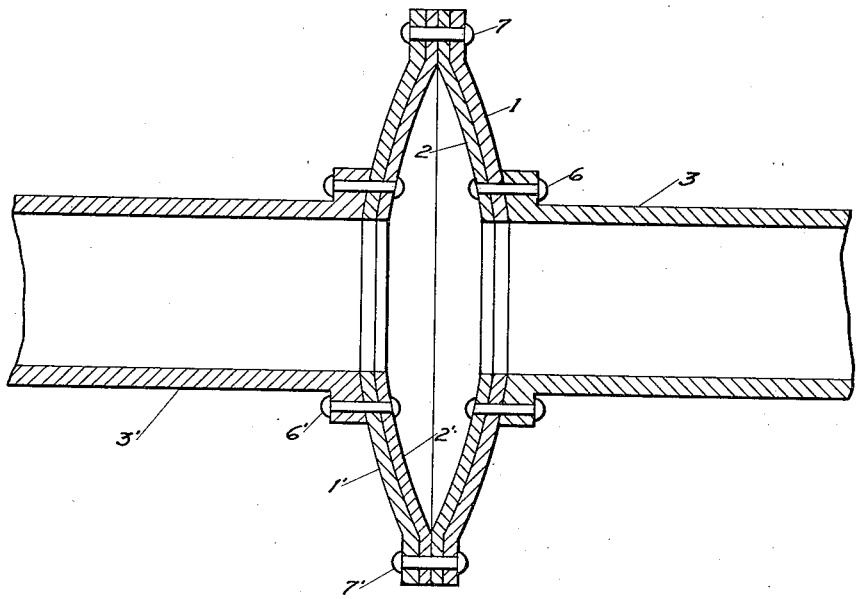
INVENTOR
Ross Gunn
BY
ATTORNEY May 12, 1942.  R. GUNN  2,282,354
EXPANSION COMPENSATING MEANS FOR STEAM PIPING
Filed Sept. 28, 1940   2 Sheets-Sheet 2

INVENTOR
Ross Gunn
BY
ATTORNEY

Patented May 12, 1942

2,282,354

UNITED STATES PATENT OFFICE 2,282,354

EXPANSION COMPENSATING MEANS FOR STEAM PIPING

Ross Gunn, Washington, D. C.

Application September 28, 1940, Serial No. 358,788

8 Claims. (Cl. 285—90)

(Granted under the act of March 3, 1883, as amended April 30, 1928; 370 O. G. 757)

This invention relates to a means for compensating for the expansion of steam piping due to heating.

It is well known that a simple steam pipe expands nearly one-fourth per cent of its length when its temperature is raised by steam. Such pipes are usually connected at each end to immovable masses of machinery with the result that in order to avoid injury to the pipe or the machinery to which it connects some means for permitting relative movement of parts of the steam pipe must be provided. Such means have in the past usually taken the form of cumbersome bends in the pipe or of joints having provisions for the sliding of the ends of the pipe therein.

The provision of large bends entails the addition of considerable weight to the installation and the bends consume a great deal of space. Both of these results are undesirable, especially on ship board where both weight and space are at a premium. The provision of sliding joints introduces complicated packing arrangements and presents the danger of steam leakage occurring at the joint.

It is an object of this invention to provide a compensating means which will comprise a joint or a section pipe having the property of shortening its dimensions along the axis of the steam pipe by the same amount as the increase in the length of the steam piping, the expansion of which it is to counteract.

It is a further object of this invention to provide such a means in a form which will be simple, inexpensive, light in weight, small in size and free of sliding parts.

The present invention involves the use of joints or sections of pipe constructed of bi-metallic sheet, which is composed of two bonded together plies of material having different expansion coefficients. It is well known that bi-metallic sheet is under stress at certain temperatures and that this stress is relieved at other temperatures depending upon the mode of fabricating and the geometry of the bi-metallic material. In the expansion systems to be disclosed, the bi-metallic sections are so fabricated that their internal stress due to differential expansion shall be a minimum when the temperature of the pipe is at its normal working value. That is to say, the bi-metallic sections are so constructed that internal stresses due to the thermal deformations are at a minimum when the pipe is at a high temperature and stressed by an external load and at a maximum at low temperatures where there is no steam pressure load on the pipe.

The construction and operation of the compensating means may be best understood by reference to the accompanying drawings, in which:

Fig. 1 is an elevational view, partly in section, of one form of compensating means shown attached to a turbine or other steam equipment;

Fig. 2 is an elevational view, in section, showing the utilization of the type of compensating means shown in Fig. 1, between two lengths of steam piping; and, Fig. 3 is an elevational view, in section, showing a second embodiment of the invention, in the form of a compensating pipe section, inserted between two steam pipes.

Figure 3:
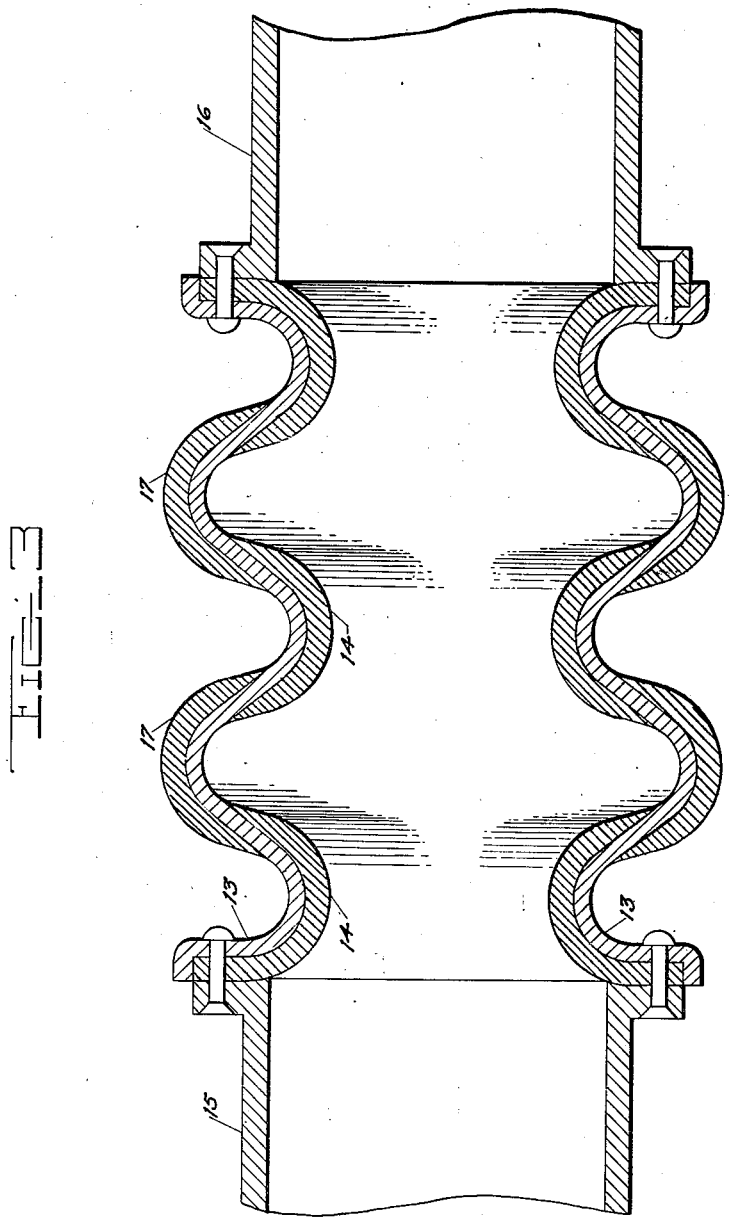

In Fig. 1 reference numerals 4 and 5 represent schematically a steam turbine or other steam equipment. A pipe delivering steam to this equipment is shown at 3. It is presumed that the admission of steam to the pipe 3 will cause its expansion due to sections of the pipe to the right of 3 and therefore the end of the pipe 3 will be displaced towards the left. In this embodiment of the invention a convex welded or brazed bi-metallic annular element 1, 2 is bolted to the end of the pipe by bolts 6 and to the equipment 4 by bolts 7, this joint being sealed by gasket 8. The bi-metallic element may be made, for example, with an outside layer 1 of brass and an inside layer 2 of iron. Other materials will serve equally well, as for example, alloy steels of different coefficients of expansion. If alloy steels are used, the material with the higher coefficient of expansion will be used for the outer sheet 1 and that with the lower coefficient will be used for the inner sheet 2.

Such an element is manufactured and properly formed to be substantially stress-free at the operating temperature of the steam employed in the system. Thus, when high pressure steam is passed through the compensating joint, the only load carried by the bi-metallic element will be the pressure load of the steam and the inner annular edge of the element will have taken the position it would normally occupy at the temperature of the steam, even if it were not connected to the pipe 3. Now if the steam is cut off and the temperature of the pipe drops, the outer material of high coefficient of expansion will contract more than will the inner material of low coefficient by expansion. This tends to throw the central section of the bi-metallic element outward, permitting the end of the pipe 3 to move to the right as the pipe itself contracts.

In Fig. 2 is shown the adaptation of this type of joint to form a bellows-like union between the ends of two pipes. The two pipes 3 and 3¹ are joined by two bi-metallic elements 1, 2 and 1¹, 2¹ with their outer peripheries bolted together by bolts 7 and their inner peripheries bolted to pipes 3 and 3¹ by bolts 6 and 6¹ respectively. The mode of operation upon expansion and contraction of the pipes is precisely the same as in the device shown in Fig. 1. Obviously, as many of the bellows-like sections as desired could be connected together, and thus compensation of the contraction or expansion of any desired length of pipe may be achieved.

Another method of construction which results in a pipe section which shortens its length as its temperature rises, is shown in Fig. 3. The pipe section is not unlike an ordinary corrugated pipe except that the inner and outer surfaces have welded to them in special regions, material having a different coefficient of expansion than that of the base corrugated pipe. In this figure the ordinary steam pipes are illustrated at each end of the compensating section and are indicated by 15 and 16. Both these pipes increase their length as the steam pressure is raised. However, in the compensating section, which is corrugated as shown, the material 13 is a material having a moderately low expansion coefficient such as ordinary iron or special low expansion alloys. Welded to the inside of each inwardly extending fold of the material 13 is a jacket 14 of a material having a higher coefficient of expansion. Each of these jackets completely covers the surface of one of the inwardly extending convolutions. Similarly, there is welded to the outside of each of the outwardly extending convolutions of the material 13 a jacket 17 of the same material as the jackets 14.

The two materials are welded and stress relieved at a temperature approximating that of the high pressure steam at which the joint is to be used. Thus when steam pressure is applied, the compensating section is subject only to the load of the steam. However, when the pipe cools due to the removal of the steam, the material of jackets 14 and 17, because of its greater expansion coefficient, contracts more than the material 13. This tends to open out the convolutions of the pipe and the pipe expands. This expansion, by the proper selection of materials, thicknesses of section, dimensions of the convolutions, and by proper selection of length, may be readily calculated so that it is exactly equal to the combined contractions of 15 and 16. Thus it is clear that no stress will be applied to the structure connected to pipes 15 and 16 due to their contraction.

While the disclosure has consistently referred to the use of the invention in connection with steam fixing, it is obvious that it may be employed with any piping which is subjected to deformation due to heating and cooling.

It should be understood that the practice of the invention is not limited to the embodiments illustrated and described but only by the scope and limitations of the appended claims.

The invention described herein may be manufactured and/or used by or for the Government of the United States of America for governmental purposes without the payment of any royalties thereon or therefor.

I claim:

1. Means for compensating for the expansion and contraction of piping due to heat, comprising a bi-metallic element, said element comprising two facing plies of material having different coefficients of expansion bonded together in such a manner as to be under a minimum of stress due to said different coefficients of expansion at the normal working temperature of said piping, said element being secured to an end of said piping and to the structure to which said end would otherwise be connected and forming a tight connection therebetween, the orientation, materials, shape and dimensions of said element being so selected that, within the normal service range of heating and cooling of said piping the portion of said element secured to said piping will at all times occupy substantially the same position in space that it would occupy if it were free of said piping.

2. Means for compensating for the expansion and contraction of piping due to heat, comprising a connecting means formed of bi-metallic sheet comprising two facing plies of material having different coefficients of expansion bonded together and capable of being secured in a tight manner to an end of a pipe and to the structure to which said pipe would otherwise be secured, and when so secured to separate the surfaces of said pipe and said structure to which it is secured by an amount sufficient to allow uninterrupted movement of the end of said pipe due to expansion and contraction, the orientation, materials, shape and dimensions of said connecting means being so selected that, within the normal service range of heating and cooling of said piping the portion of said connecting means secured to said piping will at all times occupy substantially the same position in space that it would occupy if it were free of said piping.

3. Means for compensating for the expansion and contraction of piping due to heat, comprising a bi-metallic element, said element comprising two facing plies of material of different coefficients of expansion bonded together in such a manner as to be under a minimum of stress due to said differing coefficients of expansion at the normal working temperature of said piping, said element being formed in the shape of a disc having a hole in the center thereof forming a passage therethrough, the central periphery of said element being secured to an end of said piping, and the outer periphery of said element being secured to the structure to which said end of said piping is normally secured, in such a manner that said element forms a tight connection between said end and said structure, the orientation, materials and dimensions of said element being so selected that, within the normal service range of heating and cooling of said piping the portion of said element secured to said piping will at all times occupy substantially the same position in space that it would occupy if it were free of said piping.

4. Means for compensating for the expansion and contraction of piping due to heat, comprising a pair of dished, disc-shaped bi-metallic elements, each of said elements comprising two facing plies of material of different coefficients of expansion bonded together in such a manner as to be under a minimum of stress due to said differing coefficients of expansion at the normal working temperature of said piping, each of said elements having a hole in the center thereof forming a passage therethrough, the central periphery of each of said elements being secured to an end of said piping with the convex face of said element toward said piping, means securing together the outer peripheral portions of said elements in such a manner that said elements form a tight connection between the ends of said piping, the materials and dimensions of said elements being so selected that, within the normal range of heating and cooling of said piping the portions of said elements secured to said piping will at all times occupy substantially the same positions in space that they would occupy if they were free of said piping.

5. Means for compensating for the expansion and contraction of piping due to heat, comprising a corrugated pipe section capable of insertion in a line of piping, said section being made of material having a relatively low coefficient of expansion, a jacket bonded to and substantially completely covering the inner surface of each inwardly directed convolution of said section, a jacket bonded to and substantially completely covering the outer surface of each of the outwardly directed convolutions of said section, the coefficient of expansion of the material of said jackets being relatively high with respect to the material of said section, the materials and dimensions of said section and said jackets being so selected that, within the normal range of heating and cooling of said piping, the ends of said section, when said section is inserted in said piping and secured thereto, will at all times occupy substantially the same positions in space that they would occupy if they were free of said piping.

6. Means for compensating for the expansion and contraction of piping due to heat, comprising a bi-metallic flange adapted to have its central periphery secured to the end of a pipe and its outer periphery secured to the structure to which said end of said pipe would otherwise be secured, the material of the face of said flange facing toward said pipe having a higher coefficient of expansion than the material of the opposite face.

7. Means for compensating for the expansion and contraction of piping due to heat, comprising a bi-metallic bellows-shaped section capable of insertion between the abutting ends of two pipes and of larger diameter than said pipes, said section being formed with a central passage therein permitting uninterrupted flow between said pipes, the outer faces of said section being formed of material having a larger coefficient of expansion than the material of its inner faces.

8. Means for compensating for the expansion and contraction of piping due to heat, comprising a bi-metallic corrugated section capable of insertion between the adjacent ends of two pipes, and formed to provide an uninterrupted passage between said pipes, the outer faces of the outwardly directed convolutions and the inner faces of the inwardly directed convolutions of said section being formed of material having a greater coefficient of expansion than the material of their opposite faces.

ROSS GUNN.